United States Patent Office 3,634,579
Patented Jan. 11, 1972

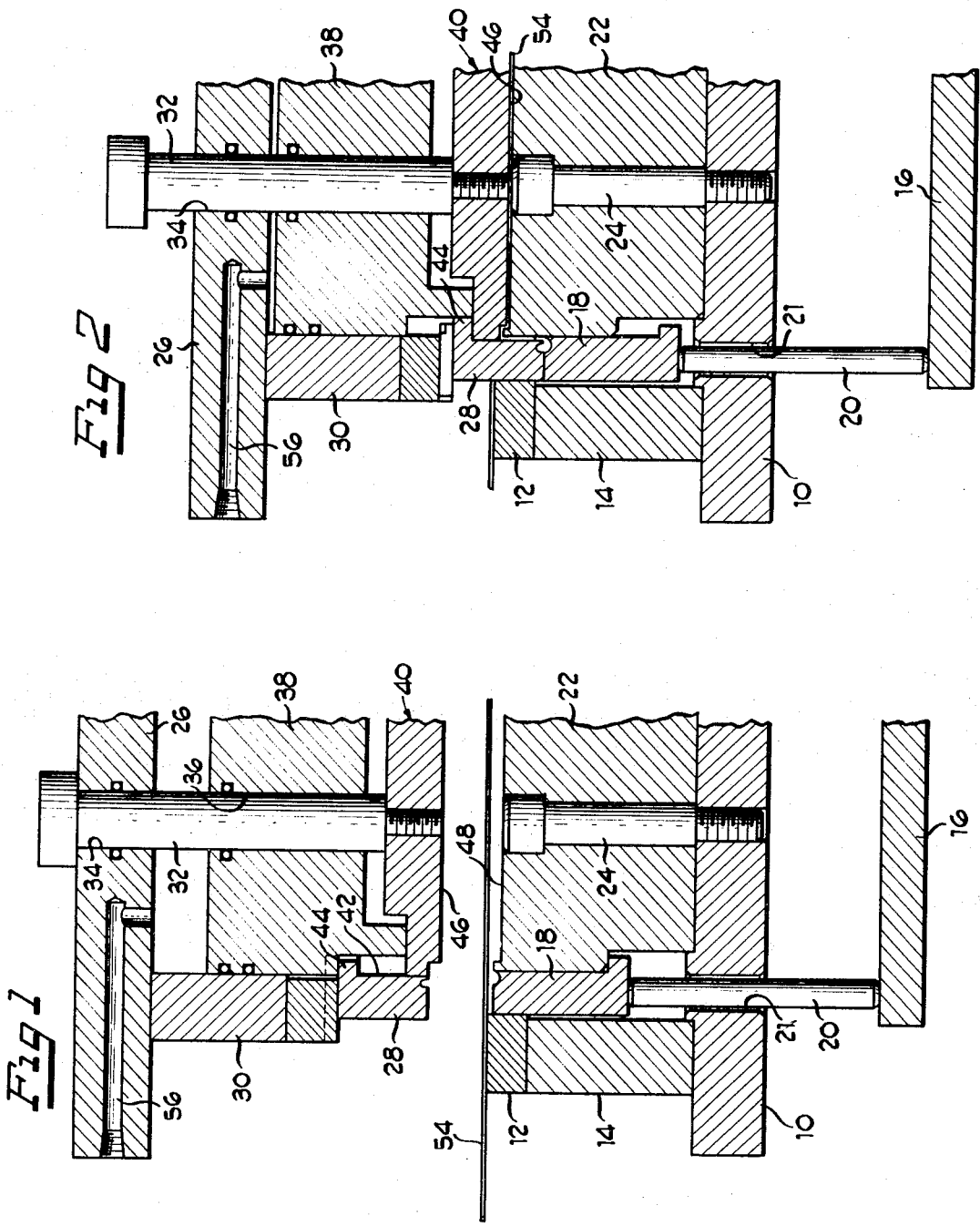

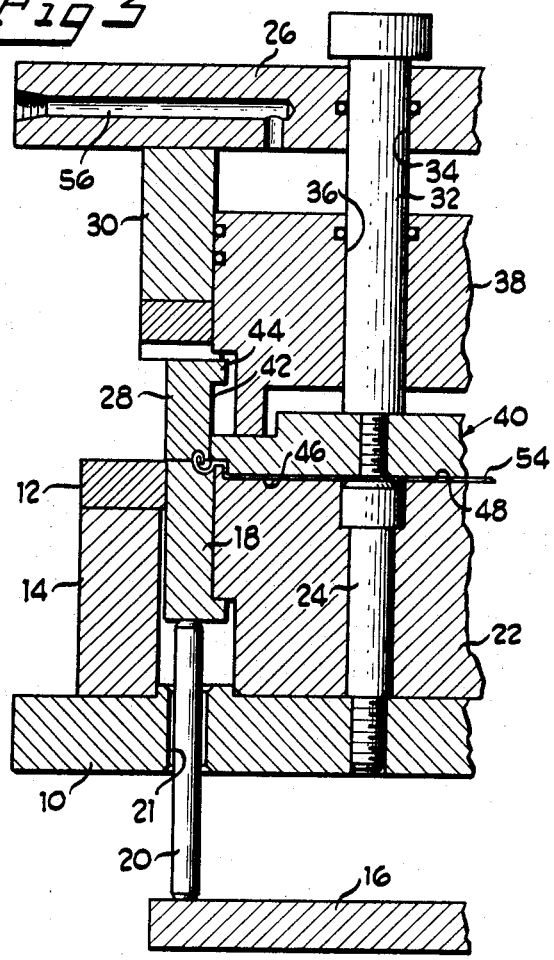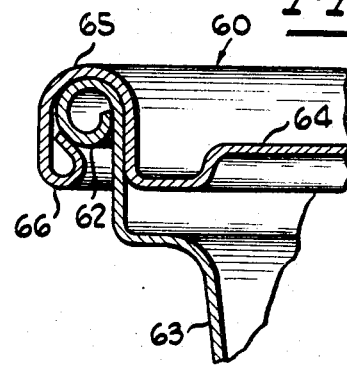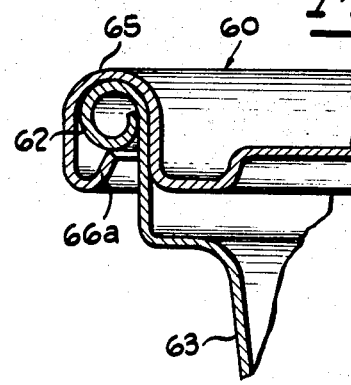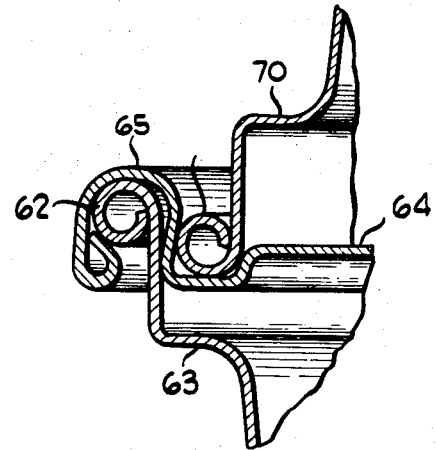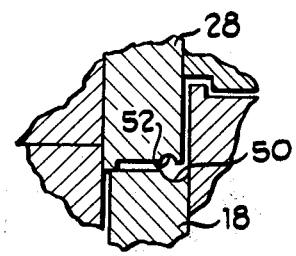

3,634,579
METHOD OF MANUFACTURE OF CONTAINER AND CLOSURE
Walter F. Matras, Port Clinton, and William R. Meadors, Fremont, Ohio, assignors to Borg-Warner Corporation, Chicago, Ill.
Filed Aug. 25, 1969, Ser. No. 852,655
Int. Cl. B29c 24/00
U.S. Cl. 264—296     1 Claim

ABSTRACT OF THE DISCLOSURE

A container and closure, or similar articles, are cold-formed from thermoplastic sheet material using a combination forming and edge curling die. A convoluted curl, i.e. one in which the edge is completely rolled under the primary curl, is produced in a die set having curling grooves in both the upper and lower draw rings. During the return stroke of the forming operation, a primary curl is formed and, as the lower and upper draw rings travel relative to the punch, a secondary curl is formed to provide a convoluted edge.

BACKGROUND AND SUMMARY OF THE INVENTION

In the manufacture of thermoplastic articles such as cups and lids, either by compression or injection molding, edge curling is normally a separate operation. Special machines which are adapted to engage and curl the edge of of a cup or lid by progressively rolling the edge into a tighter configuration are shown, for example, in U.S. Pat. 3,096,546, issued to B. Edwards on July 14, 1963. In some metal forming operations, it has been possible to curl the edge during the forming operation by using a curling die in combination with the draw ring or draw pad. In this case, a primary curl, that is, one in which a single return bend is formed, can be applied to the edge. This type of apparatus is described in U.S. Pat. 1,884,708, issued to G. R. Jeneson on Oct. 25, 1932.

With the discovery of certain thermoplastic materials which are capable of being formed at, or near, room temperature, the advantages afforded by such a process, for example, high production rates and low tooling costs, have attracted much interest. One thermoplastic material which is especially useful in cold-forming techniques is a graft polymer of acrylonitrile, butadiene and styrene (ABS).

One of the problems which has been encountered in practicing cold-forming of plastic sheets has to do with shaping of the edges. Generally, when the parts are blanked, the edges are ragged and uneven. This not only makes them more susceptible to tearing, but, also, detracts from the overall appearance. As a result, it has been common practice to roll the edge in a separate operation, such as discussed above.

In the present invention, which relates to and the method of, cold-forming a thermoplastic part, it has been discovered that a convolute curl may be formed on the edge of a lid or cup in a single drawing cycle. By providing a curling groove in both the upper and the lower draw rings, the edge is first shaped to form a primary curl; and then, as the edge is forced up against the curling groove in the upper draw ring, it is caused to curl back on itself to form the convolute configuration. Not only is the appearance of the edge improved, because of the hidden edge, but, also, in the case of a lid, it may be modified slightly to provide lock-on lids and dual-purpose lids which will be described in more detail below.

It is, therefore, a principal object of the invention to provide an improved method of manufacturing a container, or closure therefor, in which the edge is completely hidden from view, due to a convolute configuration.

Another object of the invention is to provide an improved method of providing a convolute edge configuration which may be modified to form a lock-on lid or a dual-purpose lid, i.e., one in which the lid acts as a closure for two containers at the same time.

Another object of the invention is to provide an improved process for cold-forming thermoplastic materials in which a convolute edge is formed in a single drawing cycle.

Additional objects and advantages will become apparent from reading the following detailed description taken in conjunction with the drawings.

DESCRIPTION OF THE DRAWINGS

FIG. 1 is a partial transverse sectional view taken through a closure or lid forming apparatus suitable for performing the present invention (without the conventional press elements being shown), said view illustrating the relation of parts prior to engaging the sheet material;

FIG. 2 is a view similar to FIG. 1 showing the relation of parts at the end of the drawing stroke, i.e., when one-half of the cycle has been completed;

FIG. 3 is a view similar to FIGS. 1 and 2 illustrating the relation of the parts after forming of the part has been completed and approximately mid-way between the positions shown in FIGS. 1 and 2.

FIG. 4 is a detailed cross-sectional view showing the curling grooves in the upper and lower drawings.

FIG. 5 is a partial cross-sectional view illustrating one form of closure formed according to the present invention and an associated container;

FIG. 6 is a view similar to FIG. 5 showing a modification of the closure; and

FIG. 7 is another modification showing a dual purpose closure.

DETAILED DESCRIPTION OF THE INVENTION

The apparatus disclosed in FIGS. 1 to 4 for the purpose of illustrating the invention is embodied in a standard form of press and comprises a shoe or die mounting plate 10 which is mounted on a press bed or bolster plate (not shown) in the usual and preferred manner. The die mounting plate 10 supports an annular shear ring 12 securely held in position on a locating ring 14.

Underneath the lower mounting plate 10 is a pressure pad 16 carried by an air cushion or similar device (not shown) which is designed to maintain a relatively constant pressure on the lower draw ring 18. The air cushion pins 20 projecting through holes in 21 in the shoe, support the lower draw ring 18. The latter surrounds, and is moveable with respect to, punch 22 which is secured to the mounting plate by bolt 24.

The upper shoe or mounting plate 26, secured to and driven by the ram or upper moveable portion of the press (not shown) supports the upper draw ring 28, carried on the lower end of cylinder sleeve 30. A knockout pin 32 extends through a sealed opening 34 in the upper shoe 26 and passes through a bore 36 in piston 38. A combination knockout and forming pad 40 is fixed to the lower end of pin 32, said pad being guided by the cylindrical surface 42 on the upper draw ring 28 and engageable by an inwardly extending shoulder 44 on the latter.

It will be noted that the knockout and forming pad 40 has a configuration with a central projection 46 which cooperates with a complementary recess 48 on the face of the punch. This is for the purpose of forming a centrally located panel on the article for both extra rigidity and a more attractive appearance.

To this point, the description has referred to a conventional forming die assembly suitable for the drawing of articles from a web. The present invention relates to an improvement whereby a convolute curl may be provided on the edge of the articles during the drawing operation. As best illustrated in FIG. 4, the lower draw ring 18 is constructed with an annular groove 50 adjacent the inside surface thereof; and the upper draw ring 28 is furnished with a similar, but slightly smaller, groove 52 which is located just outside the I.D. of the draw ring. When the two draw rings are in engagement with the sheet, the grooves 50 and 52 form a semi-continuous curved wall starting at the I.D. of the lower draw ring, extending down, and then upwardly across the junction line. The purpose of the grooves is to engage the edges of the partly formed article during the return stroke of the ram to shape the edge into a convolute curl.

FIG. 1 shows the relative position of the parts prior to engagement with the sheet or web 54 which is initially supported on the surface of the shear ring 12. As the ram moves between the positions shown in FIGS. 1 and 2, the upper draw ring 28 and the knockout pad 40 engage the sheet, cutting or blanking the part at the edge of the shear ring 12 and gripping the blank between the two draw rings. As the ram continues to move downwardly, it draws the part over the punch 22 forming the side wall of the article (see FIG. 2). On the return stroke, air is supplied through passage 56 in the upper shoe 26 whereby it applies pressure against piston 38 to hold the knockout pad against the punch. Since the pressure pad is moving up, the pins 20 lift the lower draw ring 18 to a point where the lower curling groove 50 engages the edge of the article causing it to bend outwardly, following the contour of the groove wall. After turning out about 180°, it is constained by the upper curling groove 52 and forced inwardly to produce the desired convolute configuration whereby the edge is hidden inside the primary bend.

FIG. 5 shows a typical integral closure 60 formed in the manner just described. The body comprises a central deck section 64 shaped by the knockout pad, a primary bend 65 of approximately 180° and a secondary bend 66 of somewhat more than 180°. The closure cooperates with the lip 62 of container 63 to provide a re-useable snap-on combination. It will be noted that the lip 62 also has a convolute curl and may be formed in the same manner as the closure, the only major difference being the depth of the draw.

In the modification shown in FIG. 6, the secondary bend 66a is less than 180° so as to frictionally grip the underside of lip 62. This construction is adaptable for lock-on lid applications.

The dual-purpose closure shown in FIG. 7 cooperates with two containers, i.e., container 63 (as in FIGS. 5 and 6) and container 70. It will be noted that the wall section 72 between the deck section 64 and the primary bend 65 is shaped inwardly to engage the lip 74 of the second container and hold the three elements together. This dual-purpose concept is especially applicable to convenience foods which are to be kept separated prior to their use in combination.

While this invention has been described in connection with certain specific embodiments thereof, it is to be understood that this is by way of illustration and not by way of limitation; and the scope of the appended claim should be construed as broadly as the prior art will permit.

What is claimed is:

1. A method of cold-forming a thermoplastic part and subsequently providing a convolute edge thereon during a single drawing cycle comprising the steps of engaging a sheet of thermoplastic material between opposed die members; drawing said sheet around the edge of one of said die members to form an article having a central deck section and a side wall extending out of the plane in which said central deck section lies; engaging the edge of said article with a first member having a curling groove formed therein to form a primary curl; continuing relative movement between said first member and said one die member while engaging the curled edge with a second member having a second curling groove formed therein; continuing movement of said first and second members relative to said one die member to cause the edge to turn back upon itself to form a secondary curl and thereby force the edge to a position inside the primary curl; and further continuing movement of said first and second members relative to said one die member at least until said secondary curl enters the plane in which said central deck section lies.

References Cited
UNITED STATES PATENTS

| | | | |
|---|---|---|---|
| 1,884,708 | 10/1932 | Jeneson | 29 X |
| 2,272,920 | 2/1942 | Merta | 18—19 X |
| 3,065,677 | 11/1962 | Loeser | 264—296 X |
| 3,183,291 | 5/1965 | Miller | 264—294 X |
| 3,373,238 | 3/1968 | Powers | 264—320 X |

ROBERT F. WHITE, Primary Examiner

R. R. KUCIA, Assistant Examiner

U.S. Cl. X.R.

264—163, 320